United States Patent
Nakakura et al.

(10) Patent No.: US 9,434,020 B2
(45) Date of Patent: Sep. 6, 2016

(54) SEAM WELDING ROBOT

(71) Applicant: KABUSHIKI KAISHA YASKAWA DENKI, Kitakyushu-shi (JP)

(72) Inventors: Masami Nakakura, Kitakyushu (JP); Teppei Sonoda, Kitayushu (JP); Manabu Okahisa, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 261 days.

(21) Appl. No.: 13/956,360

(22) Filed: Aug. 1, 2013

(65) Prior Publication Data

US 2014/0061168 A1    Mar. 6, 2014

(30) Foreign Application Priority Data

Sep. 6, 2012    (JP) .................. 2012-196465

(51) Int. Cl.
*B23K 11/06* (2006.01)

(52) U.S. Cl.
CPC ............ *B23K 11/061* (2013.01); *B23K 11/063* (2013.01)

(58) Field of Classification Search
CPC ............................ B23K 11/061; B23K 11/063
USPC ................................................. 219/81, 82
See application file for complete search history.

(56) References Cited

U.S. PATENT DOCUMENTS

| 2009/0007693 | A1  |  1/2009 | Aoki et al. |             |
|--------------|-----|---------|-------------|-------------|
| 2011/0233173 | A1* |  9/2011 | Kaneko      | B23K 11/002 |
|              |     |         |             | 219/83      |
| 2012/0074103 | A1* |  3/2012 | Hasegawa    | B23K 11/061 |
|              |     |         |             | 219/102     |
| 2015/0283644 | A1* | 10/2015 | Kawai       | B25J 9/1697 |
|              |     |         |             | 219/82      |

FOREIGN PATENT DOCUMENTS

| JP | 02-092469     |   | 4/1990  |
|----|---------------|---|---------|
| JP | 2004-130323 A | * | 4/2004  |
| JP | 2006-82809  A | * | 3/2006  |
| JP | 2007-167895   |   | 7/2007  |
| JP | 2007-167896   |   | 7/2007  |
| JP | 2011-240939 A | * | 12/2011 |
| WO | WO 2004/004968|   | 1/2004  |

OTHER PUBLICATIONS

Machine translation of Japan Patent document No. 2004-130,323, Aug. 2015.*
Machine translation of Japan Patent document No. 2006-82,809, Aug. 2015.*
Machine translation of Japan Patent No. 2011-240,939-A, Dec. 2015.*
Nachirobotic, "Nachi Speed Weld Movie", Sep. 11, 2010, p. 1, XP054975304, URL:http://www.youtube.com/watch?v=iNbgQ9gs2l.
Extended European Search Report for corresponding EP Application No. 13178312.8-1702, Feb. 11, 2014.
Japanese Office Action for corresponding JP Application No. 2012-196465, Feb. 25, 2014.
Chinese Office Action for corresponding CN Application No. 201310334289.6, Apr. 29, 2015.
European Office Action for corresponding EP Application No. 13 178 312.8-1702, Dec. 10, 2015.
Nachirobotic, "Nachi Speed Weld Movie", Sep. 11, 2010, p. 1, XP054975304, URL:http://www.youtube.com/watch?v=iNbgQ9-gs21 [Retrieved on Jan. 30, 2013].
"Seam Welding Robot Standard Specification", Jan. 2010, pp. 0-13, XP055099468, URL: http://www.nachirobotics.com/images/Specifications/Seam_welder_specification.pdf [Retrieved on Jan. 30, 2014].

* cited by examiner

*Primary Examiner* — Geoffrey S Evans

(74) *Attorney, Agent, or Firm* — Mori & Ward, LLP

(57) ABSTRACT

A seam welding robot includes a robot arm and a welding unit that is coupled to the robot arm. The welding unit includes a pair of roller electrodes. The pair of roller electrodes rotates following motion of the robot arm while sandwiching and pressurizing welding targets. The welding unit passes a welding electric current between the pair of roller electrodes to seam-weld the welding targets.

4 Claims, 6 Drawing Sheets

SEAM WELDING ROBOT

CROSS-REFERENCE TO RELATED APPLICATION

The present application claims priority under 35 U.S.C. §119 to Japanese Patent Application No. 2012-196465, filed Sep. 6, 2012. The contents of this application are incorporated herein by reference in their entirety.

BACKGROUND

1. Technical Field

Embodiments of the disclosure relate to a seam welding robot.

2. Related Art

In a seam welding robot system, a welding device is provided at a tip side of a robot arm. The welding device seam-welds welding targets (objects to be welded) (for example, refer to JP 2007-167896 A). Such a welding device includes two disc-shaped roller electrodes and motors rotating the respective roller electrodes.

The welding device sandwiches the welding targets between peripheral edge portions of the two roller electrodes to pressurize the welding targets. In this state, the two roller electrodes are rotated by the motors, respectively. The welding device passes a welding electric current between the two roller electrodes to seam-weld the welding targets.

SUMMARY

A seam welding robot includes a robot arm and a welding unit that is coupled to the robot arm. The welding unit includes a pair of roller electrodes. The pair of roller electrodes rotates following motion of the robot arm while sandwiching and pressurizing welding targets. The welding unit passes a welding electric current between the pair of roller electrodes to seam-weld the welding targets.

DETAILED DESCRIPTION

Figure 1:
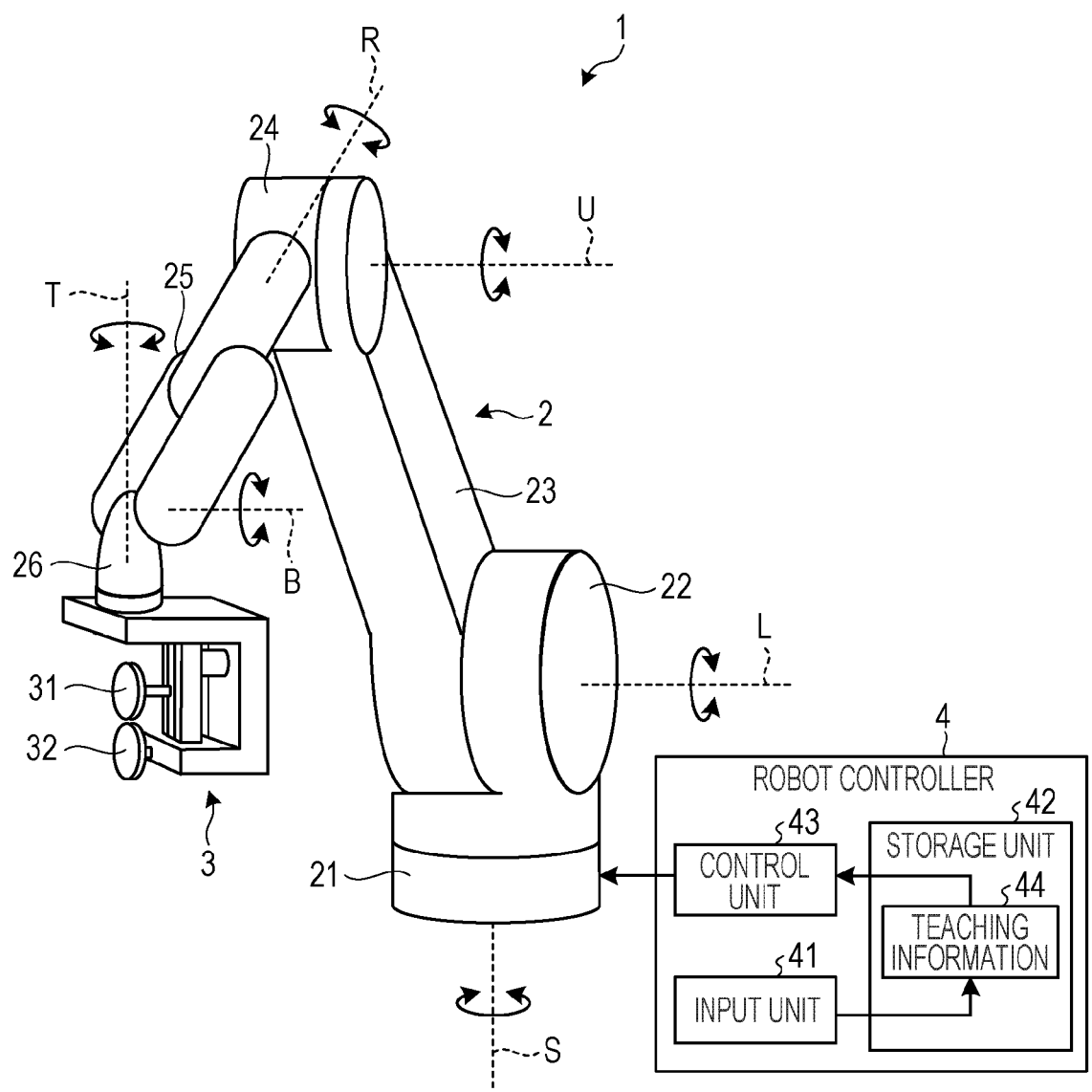
FIG. 1 is a perspective diagram schematically illustrating a seam welding robot according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

FIG. 1 is a perspective diagram schematically illustrating a seam welding robot 1 according to a first embodiment. As depicted in FIG. 1, the seam welding robot 1 includes a robot arm 2, a welding unit 3, and a robot controller 4. The welding unit 3 is connected to a tip side of the robot arm 2. The welding unit 3 seam-welds welding targets (objects to be welded).

Although not depicted in FIG. 1, the seam welding robot 1 further includes a welding power source that supplies a welding electric current to the welding unit 3. The welding power source is connected to the welding unit 3 and the robot controller 4. To perform seam-welding, the welding power source supplies a welding electric current to the welding unit 3 under instruction from the robot controller 4. The welding electric current is supplied under welding conditions that are previously set and stored in the welding power source.

The robot arm 2 includes a base portion 21, a first joint portion 22, a first arm portion 23, a second joint portion 24, a second arm portion 25, and a wrist portion 26. A bottom surface at a base end side of the base portion 21 is fixed to, for example, a substantially horizontal floor surface. The base portion 21, the first joint portion 22, the first arm portion 23, the second joint portion 24, and the second arm portion 25 are connected from the base end side to the tip side in this order.

The first joint portion 22 is rotatably connected to an upper surface of the base portion 21 at the tip side. The first joint portion 22 has a rotation axis S that extends in a substantially vertical direction. The base end side of the first arm portion 23 is swingably connected to the first joint portion 22. The first arm portion 23 has a swing axis L that extends in a substantially horizontal direction.

The second joint portion 24 is rotatably connected to the tip side of the first arm portion 23. The second joint portion 24 has a rotation axis U substantially parallel to the axis L. The base end side of the second arm portion 25 is rotatably connected to the second joint portion 24. The second arm portion 25 has a rotation axis R. The axis R extends in a direction substantially orthogonal to the axis U.

The base end side of the wrist portion 26 is swingably connected to the tip side of the second arm portion 25. The wrist portion 26 has a swing axis B substantially orthogonal to the axis R. The welding unit 3 is rotatably connected to the tip side of the wrist portion 26. The welding unit 3 has a rotation axis T substantially orthogonal to the axis B. Thus, the robot arm 2 has the degree of freedom according to the six axes S, L, U, R, B, and T. That is, the robot arm 2 serves as a multi joint manipulator.

The robot arm 2 includes a plurality of servo motors (not shown). The plurality of servo motors activates each of the axes S, L, U, R, B, and T. The robot arm 2 is connected to the robot controller 4. The robot controller 4 outputs a control signal to the plurality of servo motors of the robot arm 2. Each of the servo motors of the robot arm 2 is driven according to the control signal. Thus, the robot arm 2 performs predetermined operations and actions.

The robot controller 4 includes an input unit 41, a storage unit 42, and a control unit 43. The input unit 41 serves as an information input device operated by a user. The user operates the input unit 41 to input information on, for example, operations of the servo motors or the welding unit 3 included in the robot arm 2. The input unit 41 includes, for example, a keyboard or a touch panel. The input unit 41 outputs the information input by the user to the storage unit 42.

The storage unit 42 serves as a storage device. The storage unit 42 stores the information input from the input unit 41 as teaching information 44. The control unit 43 is a processing unit. The control unit 43 reads the teaching information 44 from the storage unit 42. The control unit 43 outputs a control signal according to the teaching information 44 to the servo motors of the robot arm 2 and the welding unit 3, or the welding power source (not shown).

The welding unit 3 includes a pair of (two) disc-shaped roller electrodes 31 and 32. The welding unit 3 serves as a welding gun that seam-welds welding targets (in the following description, the welding targets will be referred to as "works"). Of the two roller electrodes, one is connected to a positive electrode of the welding power source, and the other is connected to a negative electrode of the welding power source. One example of a specific configuration of the welding unit 3 will be described later with reference to FIGS. 2 and 3. In the following description, the upper roller electrode 31 depicted in FIG. 1 is referred to as first roller electrode 31, and the lower roller electrode 32 depicted in FIG. 1 is referred to as second roller electrode 32.

The welding unit 3 sandwiches the works between the peripheral edge portion of the first roller electrode 31 and the peripheral edge portion of the second roller electrode 32 to pressurize the works. In the welding unit 3, the first roller electrode 31 and the second roller electrode 32 rotate following the motion of the robot arm 2. In this state, the welding power supply supplies a welding electric current. The welding electric current is passed between the first roller electrode 31 and the second roller electrode 32. The welding unit 3 seam-welds the works by the welding electric current.

Thus, the welding unit 3 does not include any motor that rotates and drives the first roller electrode 31 and the second roller electrode 32. In the welding unit 3, the first roller electrode 31 and the second roller electrode 32 sandwich and pressurize the works. The first roller electrode 31 and the second roller electrode 32 conduct seam-welding while rotating following the motion of the robot arm 2.

The publicly-known seam welding robot conducts seam-welding while rotating and driving the two roller electrodes by the motors. In the seam welding robot 1 of the embodiment, the motion control of the robot arm can be simplified as compared to the publicly-known seam welding robot.

Specifically, in the publicly-known seam welding robot, there may be a difference between the rotation speed of the roller electrodes and the motion speed of the welding unit moved by the robot arm. In this case, the motion of the welding unit becomes shaky to cause an unsmooth trajectory of a weld line.

The publicly-known seam welding robot is therefore required to have accurate synchronization (cooperation) between the rotation of the motors rotating and driving the roller electrodes and the operation of the servo motors of the robot arm. This results in complicated motion control of the robot arm.

In contrast, in the seam welding robot 1 of the embodiment, the first roller electrode 31 and the second roller electrode 32 rotate following the motion of the robot arm 2. Thus, the welding unit 3 performs seam welding while moving on a smooth trajectory following the motion of the wrist portion 26 in the robot arm 2.

In the seam welding robot 1, therefore, even if the complicated motion control is not performed, the rotation speed of the first roller electrode 31 and the second roller electrode 32 are substantially coincident with the motion speed of the welding unit 3 moved by the robot arm 2

According to the seam welding robot 1, therefore, motion control of the robot arm 2 during seam welding can be simplified. Further, in the seam welding robot 1, seam welding with smooth welding lines can be performed. One example of a specific configuration of the welding unit 3 included in the seam welding robot 1 will be described below with reference to FIGS. 2 and 3.

Figure 2:
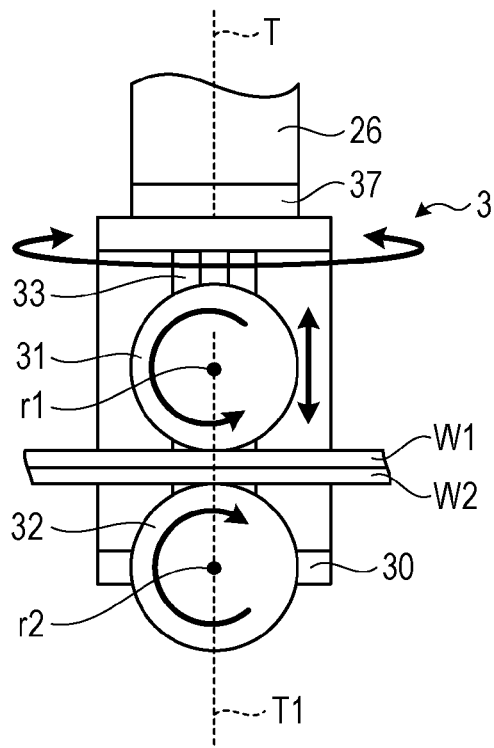
FIG. 2 is an explanatory diagram schematically illustrating a welding unit and a tip portion of a robot arm in the seam welding robot according to the first embodiment.
Figure 3:
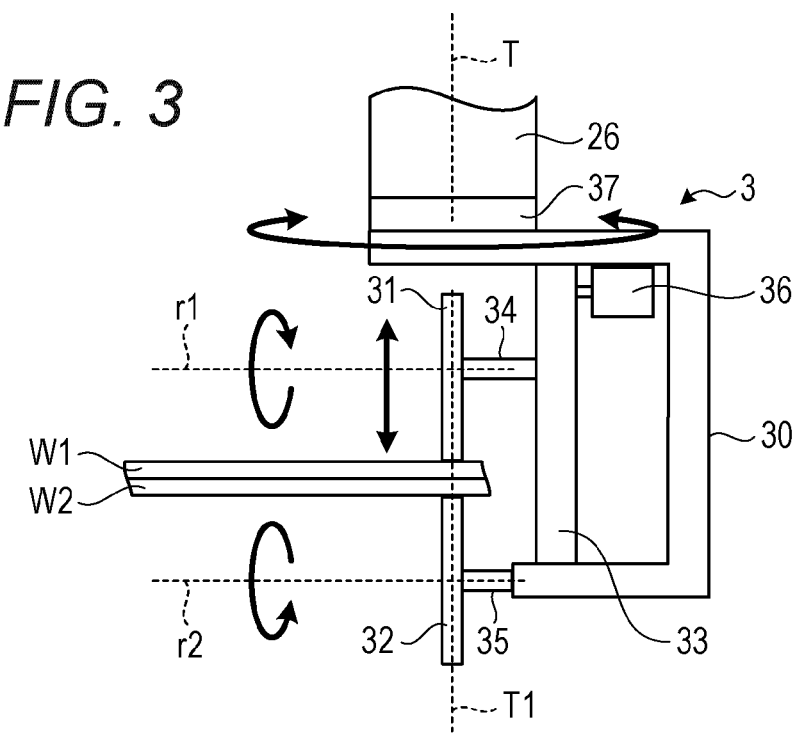
FIG. 3 is an explanatory diagram schematically illustrating the welding unit and the tip portion of the robot arm in the seam welding robot according to the first embodiment.

FIGS. 2 and 3 are explanatory diagrams schematically illustrating the welding unit 3 and the tip portion of the robot arm 2 according to the first embodiment. FIG. 2 depicts schematically one side surface of the welding unit 3 as seen from the left side in the direction of welding (hereinafter, referred to as "front surface"). FIG. 3 depicts schematically a side surface of the welding unit 3 as seen from the rear side in the direction of welding.

As depicted in FIGS. 2 and 3, the welding unit 3 includes a rotation mechanism (first rotation mechanism) 37, a frame 30, a lifting and lowering mechanism 33, a servo motor 36, the first roller electrode 31, and the second roller electrode 32. The rotation mechanism 37 is rotatably coupled at an upper surface thereof to a tip of the wrist portion 26 in the robot arm 2. The axis T serves as a rotation axis of the rotation mechanism 37. The rotation mechanism 37 is coupled and fixed at a lower surface thereof to an upper surface of the frame 30.

Thus, the welding unit 3 includes the rotation mechanism 37 at a portion coupled to the robot arm 2. The rotation mechanism 37 rotates following the motion of the robot arm 2. In the following description, the rotation mechanism 37 is rotatably coupled to the wrist portion 26. The rotation mechanism 37 may be coupled and fixed at the upper surface thereof to the tip of the wrist portion 26, and be coupled and fixed at the lower surface thereof to the upper surface of the frame 30 so as to be rotatable around the axis T as a rotation axis.

The frame 30 includes a top plate portion and a bottom plate portion arranged vertically opposed to each other, and a rear plate portion. The top plate portion and the bottom plate portion are rectangle-shaped. The rear plate portion couples the top plate portion and the bottom plate portion at the rear surface side of the welding unit 3. The frame 30 is C-shaped in a side view.

The bottom plate portion of the frame 30 is formed such that a front-side end face thereof is positioned nearer the rear plate portion than a front-side end face of the top plate portion. The disc-shaped second roller electrode 32 is rotatably provided on the front-side end face of the bottom plate portion via a rotation shaft 35. The second roller electrode 32 has a rotation axis r2.

The lifting and lowering mechanism 33 is provided such that an upper surface thereof is coupled to a bottom surface of the top plate portion of the frame 30 and a lower surface thereof is coupled to an upper surface of the bottom plate portion of the frame 30. The disc-shaped first roller electrode 31 is rotatably provided on the front surface side of the lifting and lowering mechanism 33 via a rotation shaft 34. The first roller electrode 31 has a rotation axis r1.

The first roller electrode 31 is provided so as to be lifted and lowered in a direction of extension of a straight line T1 that connects the rotation center of the first roller electrode 31 and the rotation center of the second roller electrode 32. The straight line T1 connecting the rotation centers of the first roller electrode 31 and the second roller electrode 32 substantially coincides with the axis T as rotation axis of the welding unit 3. That is, the straight line T1 and the axis T are on substantially the same straight line.

The servo motor 36 is provided on the rear surface side of the lifting and lowering mechanism 33. The servo motor 36 outputs a drive force for lifting and lowering the first roller electrode 31 to the lifting and lowering mechanism 33. The servo motor 36 operates according to a control signal input from the robot controller 4 (refer to FIG. 1). The servo motor 36 adjusts a pressurizing force that pressurizes a peripheral edge portion of the first roller electrode 31 toward a peripheral edge portion of the second roller electrode 32.

Here, seam welding performed by the seam welding robot 1 will be described. In the case as depicted in FIGS. 2 and 3, edge portions of overlapped first work W1 and second work W2 are seam-welded in a linear manner. In addition, in the case described later with reference to FIGS. 4 and 5, seam welding is conducted in a changed welding direction.

On seam welding, the robot controller 4 activates the robot arm 2 to move the welding unit 3. Thus, the welding position of the overlapped first work W1 and second work W2 is moved to a position where these works W1, W2 are sandwiched between the peripheral edge portion of the first roller electrode 31 and the peripheral edge portion of the second roller electrode 32.

The robot controller 4 drives the servo motor 36 of the welding unit 3 to lower the first roller electrode 31. Thus, the first roller electrode 31 and the second roller electrode 32 sandwich the first work W1 and the second work W2 between the peripheral edge portions thereof. Further, the robot controller 4 increases a sandwiching force of the first roller electrode 31 and the second roller electrode 32 by the servo motor 36 to pressurize the welding position of the works W1 and W2 under a predetermined pressure.

Subsequently, the robot controller 4 issues a command to the welding power source to pass a predetermined welding electric current between the first roller electrode 31 and the second roller electrode 32. In this state, the robot controller 4 drives the robot arm 2. Thus, the wrist portion 26 moves in a direction substantially parallel to the direction of welding. This allows the first roller electrode 31 and the second roller electrode 32 at the welding unit 3 to rotate following the motion of the robot arm 2.

At that time, resistance heat is generated at the welding position of the first work W1 and the second work W2 by the welding electric current passed between the first roller electrode 31 and the second roller electrode 32. The first work W1 and the second work W2 are melted by the resistance heat. Thus, the first work W1 and the second work W2 are seam-welded.

Here, in the seam welding robot 1, the straight line T1 and the axis T substantially coincide with each other as depicted in FIGS. 2 and 3. That is, the straight line T1 and the axis T are on substantially the same straight line. Therefore, linear seam welding can be easily conducted only by performing simple motion control under which the wrist portion 26 is moved in a desired welding direction.

The welding unit 3 of the seam welding robot 1 adjusts a pressurizing force applied to the first work W1 and the second work W2 by the first roller electrode 31 and the second roller electrode 32. The pressurizing force of the welding unit 3 is adjusted not by a general air cylinder but by the servo motor 36. Thus, the seam welding robot 1 can adjust the pressurizing force swiftly and finely as compared to the case of using an air cylinder.

For example, if the pressurizing force of the first roller electrode 31 is adjusted by an air cylinder, the pressurizing force decreases significantly only by removing a slight amount of air from the air cylinder when the pressure of the pressurizing force is lowered. Thus, to decrease the pressurizing force to a desired pressure, it is necessary to temporarily decrease the pressurizing force to a pressure lower than the desired pressure, and then raise the pressurizing force to the desired pressure.

In contrast, the welding unit 3 adjusts the pressurizing force by the servo motor 36. According to the welding unit 3, the pressurizing force can be decreased to a desired pressure, without decreasing the pressurizing force to a pressure lower than the desired pressure, by controlling a motor torque of the servo motor 36.

Figure 4:
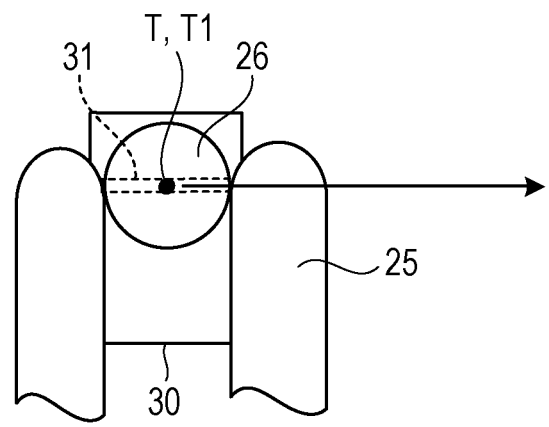
FIG. 4 is an explanatory diagram schematically illustrating the welding unit according to the first embodiment as viewed from the top.
Figure 5:
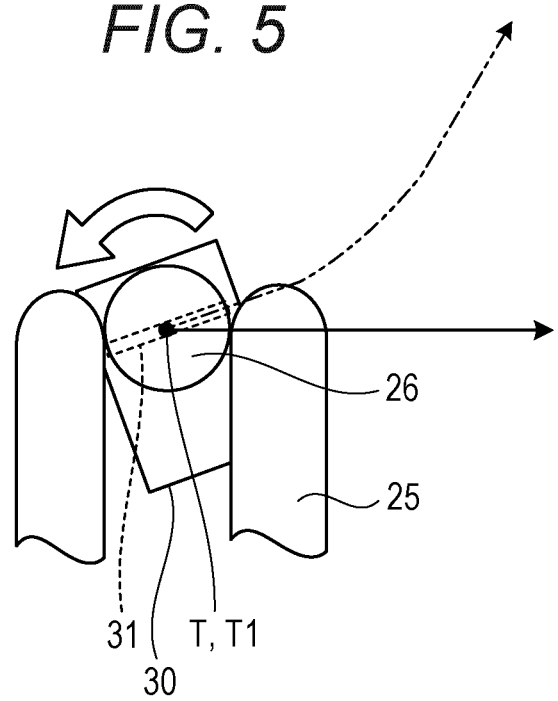
FIG. 5 is an explanatory diagram schematically illustrating the welding unit according to the first embodiment as viewed from the top.

Next, one example of operation of the welding unit 3 when the direction of welding is changed by the seam welding robot 1 will be described with reference to FIGS. 4 and 5. FIGS. 4 and 5 are explanatory diagrams schematically illustrating the welding unit 3 according to the first embodiment as viewed from the top.

FIG. 4 depicts the state of the welding unit 3 before the change of the direction of welding. FIG. 5 depicts the state of the welding unit 3 during change of the direction of welding. In the following description, the same components depicted in FIG. 4 as those depicted in FIGS. 1 to 3 are given the same reference numerals as those depicted in FIGS. 1 to 3, and descriptions thereof will be omitted.

As depicted in FIG. 4, it is assumed that, before the change of the direction of welding by the seam welding robot 1, for example, the seam welding robot 1 conducts linear seam welding in the direction of welding depicted by a solid arrow. Then, when the direction of welding is changed diagonally forward on left side, for example, the robot controller 4 controls the wrist portion 26 to move in a desired direction of welding depicted by a two-dot chain line in FIG. 5. Specifically, the robot controller 4 controls the wrist portion 26 to move diagonally forward on the left side with respect to the direction of welding before the change depicted by the solid arrow.

Thus, in the welding unit 3, the rotation mechanism 37 (refer to FIGS. 2 and 3) rotates around the straight line T1 and the axis T following the motion of the robot arm 2. The frame 30 rotates around the straight line T1 and the axis T counterclockwise viewed from the top as depicted by a void arrow with respect to the wrist portion 26. Thus, the welding unit 3 rotates in the direction depicted by the void arrow while following the movement of the wrist portion 26. This allows the direction of welding by the welding unit 3 to be changed to the direction depicted by the two-dot chain line.

Thus, in the seam welding robot 1, the robot controller 4 performs simplified motion control on the robot arm 2 to change the direction of motion of the wrist portion 26 to a desired direction of welding. Thus, the direction of seam welding can be easily changed.

As described above, the seam welding robot according to the first embodiment includes the robot arm and the welding unit coupled to the tip side of the robot arm. The welding unit sandwiches welding targets between the peripheral edge portions of the two disc-shaped roller electrodes. In this state, the two roller electrodes rotate following the motion of the robot arm. The welding unit seam-welds the welding targets by the welding electric current passed between the two roller electrodes.

Thus, in the seam welding robot according to the first embodiment, the motor driving the two roller electrodes is excluded from the welding unit. This can simplify the motion control of the robot arm conducting seam welding.

The welding unit according to the first embodiment further includes the rotation mechanism at the portion coupled to the robot arm. The rotation mechanism rotates following the motion of the robot arm. Thus, the rotation mechanism rotates following the motion of the robot arm under the simplified motion control of moving the tip side of the robot arm. This allows the welding unit to be changed in orientation following the motion of the robot arm. In this manner, the direction of welding can be easily changed.

At that time, the rotation mechanism of the seam welding robot according to the first embodiment rotates around the straight line connecting the rotation centers of the two roller electrodes. Thus, the direction of welding can be easily changed to a desired direction by performing the simple motion control on the robot arm to move the tip side of the robot arm in a desired direction of welding.

In the seam welding robot according to the first embodiment, the motor driving the two roller electrodes is not provided at the welding unit. This makes it possible to reduce the weight of the welding unit as compared to the welding unit with the motor driving the roller electrodes.

Therefore, in the seam welding robot 1 according to the first embodiment, the output of the robot arm can be made smaller as compared to the case of moving the welding unit including the motor for driving the roller electrodes. Thus, the seam welding robot 1 can include a less expensive and small-sized robot arm.

Second Embodiment

Next, a seam welding robot 1a according to a second embodiment will be described with reference to FIGS. 6 and 7. In the embodiment, the same components depicted in FIGS. 6 and 7 as those depicted in FIG. 3 or 5 are given the same reference numerals as those depicted in FIG. 3 or 5, and descriptions thereof will be omitted.

Figure 6:
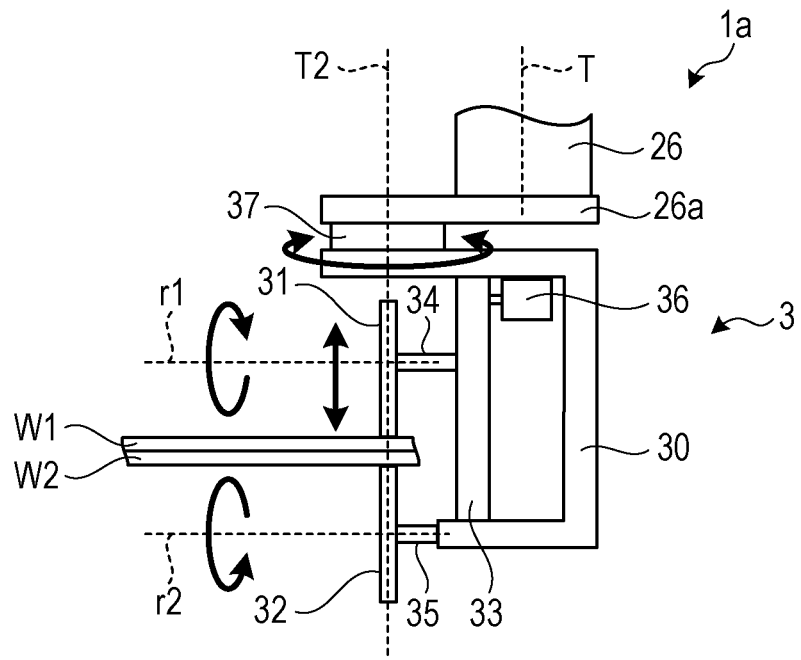
FIG. 6 is an explanatory diagram schematically illustrating a tip portion of a robot arm in a seam welding robot according to a second embodiment.
Figure 7:
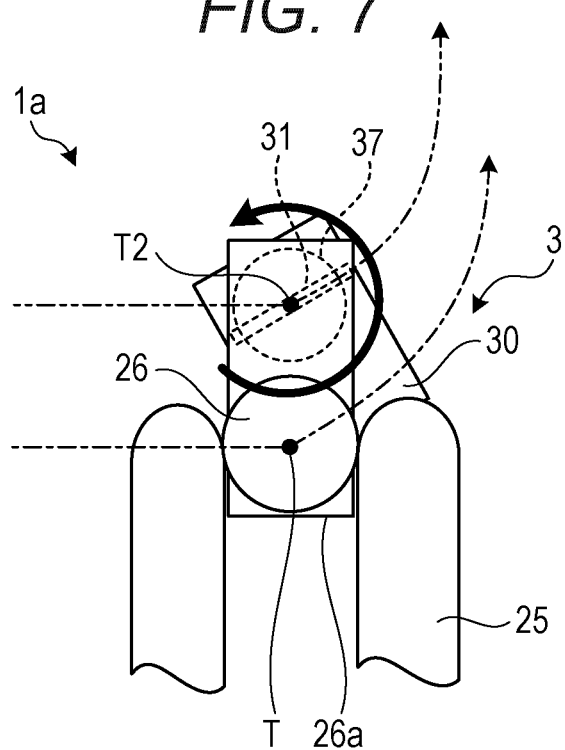
FIG. 7 is an explanatory diagram schematically illustrating motion of the seam welding robot according to the second embodiment as viewed from the top.

FIG. 6 is an explanatory diagram schematically illustrating a tip portion of the robot arm 2 in the seam welding robot 1a according to the second embodiment. FIG. 6 depicts schematically a side surface of the welding unit 3 as seen from the back side in the direction of welding. FIG. 7 is a schematic explanatory view as viewed from the top depicting the operation of the seam welding robot 1a according to the second embodiment.

As depicted in FIG. 6, the seam welding robot 1a according to the second embodiment includes the welding unit 3 that is substantially the same as that in the first embodiment. However, in the seam welding robot 1a according to this embodiment, the attachment position of the wrist portion 26 at the welding unit 3 is different from that in the seam welding robot 1 according to the first embodiment.

Specifically, a plate 26a is fixed to the wrist portion 26 on a tip surface of the wrist portion 26 included in the seam welding robot 1a. The plate 26a extends in a direction substantially perpendicular to the axis T and substantially perpendicular to the direction of welding. The upper surface of the rotation mechanism 37 at the welding unit 3 is rotatably attached to a lower surface of the plate 26a at a position distant from the wrist portion 26.

Specifically, in the seam welding robot 1a, the rotation axis T of the wrist portion 26 and the rotation axis T2 of the rotation mechanism 37 are shifted from each other. That is, in the seam welding robot 1a, the rotation mechanism 37 (or the rotation axis T2 of the rotation mechanism 37) is disposed at a position shifted from the tip portion of the robot arm 2.

In the seam welding robot 1a, the axis T2 is a straight line connecting the rotation centers of the first roller electrode 31 and the second roller electrode 32, and is also the rotation axis of the rotation mechanism 37. The axis T2 is parallel to the axis T at a position separated from the axis T.

The seam welding robot 1a can also change the direction of welding by rotating the welding unit 3 following the motion of the robot arm 2. For example, to change the direction of welding forward on the left side as depicted in FIG. 7, the robot arm 2 is driven to change the direction of movement of the wrist portion 26 forward on the left side with respect to the previous direction of movement, as depicted by a chain line in FIG. 7.

In the seam welding robot 1a, the rotation mechanism 37 rotates around the axis T2 as a rotation axis while following the motion of the robot arm 2. At that time, as depicted in FIG. 7, the frame 30 rotates leftward with respect to the plate 26a (counterclockwise as viewed from the top) around the axis T2 as a rotation axis. Thus, the direction of welding is changed forward on the left side as depicted by a two-dot chain line in FIG. 7.

Thus, according to the seam welding robot 1a, the direction of welding can be easily changed to a desired direction by performing simple motion control under which the wrist portion 26 is moved in substantially parallel to the desired direction of welding.

In addition, in the seam welding robot 1a, the position of welding by the welding unit 3 can be set to be most distant from the wrist portion 26 (shifted from the wrist portion 26). Thus, an influence of heat generated at seam welding by the welding unit 3 on the robot arm 2 can be reduced.

As described above, in the seam welding robot 1a according to the second embodiment, the direction of welding can be changed to a desired direction by performing the simplified motion control on the robot arm 2. Further, in the seam welding robot 1a, an influence of heat generated at seam welding on the robot arm 2 can be reduced.

Third Embodiment

Next, a seam welding robot 1b according to a third embodiment will be described with reference to FIGS. 8 and 9. In the embodiment, the same components depicted in FIGS. 8 and 9 as those depicted in FIG. 2 or 5 are given the same reference numerals as those depicted in FIG. 2 or 5, and descriptions thereof will be omitted.

Figure 8:
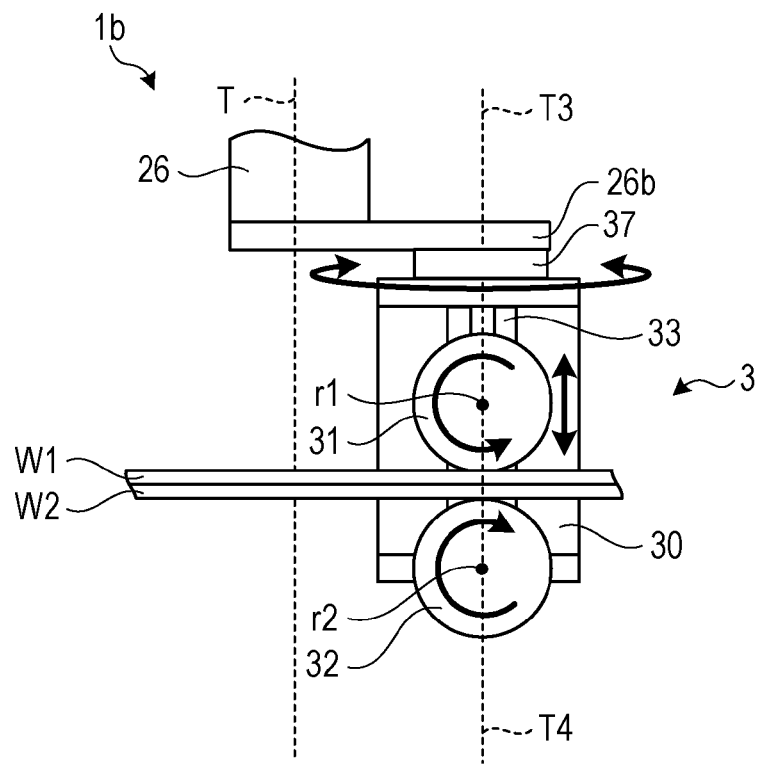
FIG. 8 is an explanatory diagram schematically illustrating a tip portion of a robot arm in a seam welding robot according to a third embodiment.
Figure 9:
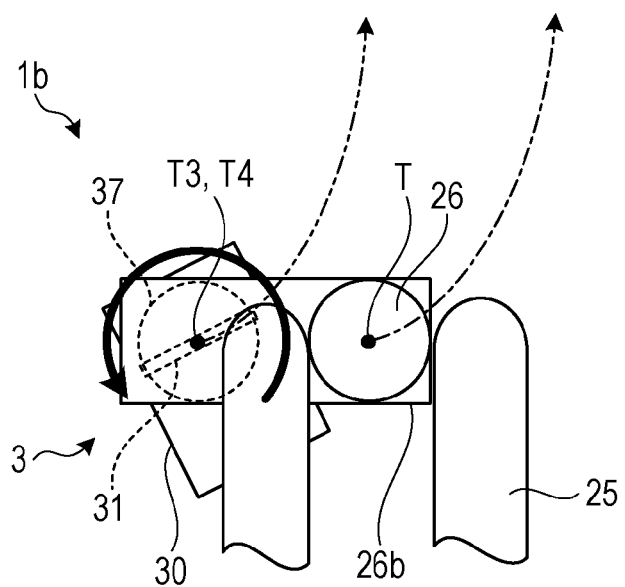
FIG. 9 is an explanatory diagram schematically illustrating motion of the seam welding robot according to the third embodiment as viewed from the top.

FIG. 8 is a schematic explanatory diagram illustrating a tip portion of the robot arm 2 in the seam welding robot 1b according to the third embodiment. FIG. 8 depicts schematically a front surface of the welding unit 3 as seen from the left side in the direction of welding. FIG. 9 is a schematic explanatory view as viewed from the top depicting the operation of the seam welding robot 1b according to the third embodiment.

As depicted in FIG. 8, the seam welding robot 1b according to the third embodiment includes substantially the same welding unit 3 as that in the first embodiment. However, in the seam welding robot 1b according to this embodiment, the attachment position of the welding unit 3 at the wrist portion 26 is different from that in the seam welding robot 1 in the first embodiment.

Specifically, a plate 26b is fixed to the wrist portion 26 on a tip surface of the wrist portion 26 included in the seam welding robot 1b. The plate 26b extends in a direction substantially perpendicular to the axis T and substantially parallel to the direction of welding. The upper surface of the rotation mechanism 37 at the welding unit 3 is rotatably attached to a lower surface of the plate 26b at a position distant from the wrist portion 26.

Specifically, in the seam welding robot 1b, the rotation axis T of the wrist portion 26 and the rotation axis T2 of the rotation mechanism 37 are shifted from each other as in the seam welding robot 1a. That is, in the seam welding robot 1b, the rotation mechanism 37 (or the rotation axis T2 of the rotation mechanism 37) is disposed at a position shifted from the tip portion of the robot arm 2.

In the seam welding robot 1b, the axis T3 is a straight line connecting the rotation centers of the first roller electrode 31 and the second roller electrode 32, and is also the rotation axis of the rotation mechanism 37. The axis T3 is positioned posterior to the axis T in the direction of welding.

The seam welding robot 1b can also change the direction of welding by rotating the welding unit 3 following the motion of the robot arm 2. For example, to change the direction of welding forward on the left side as depicted in FIG. 9, the robot controller 4 drives the robot arm 2 to change the direction of movement of the wrist portion 26 forward on the left side with respect to the previous direction of movement, as depicted by a chain line in FIG. 9.

In the seam welding robot 1b, the rotation mechanism 37 rotates around the axis T3 as a rotation axis following the motion of the robot arm 2. At that time, as depicted in FIG. 9, the frame 30 rotates leftward with respect to the plate 26b (counterclockwise as viewed from the top) around the axis T3 and the straight line T4 as rotation axes. Thus, the direction of welding is changed forward on the left side as depicted by a two-dot chain line in FIG. 9.

Thus, according to the seam welding robot 1b, the direction of welding can be easily changed to a desired direction by performing simple motion control under which the wrist portion 26 is moved in substantially parallel to the desired direction of welding.

In the seam welding robot 1b, the position of welding by the welding unit 3 can be set to be most distant from the wrist portion 26 (shifted from the wrist portion 26) as in the seam welding robot 1a according to the second embodiment. Thus, an influence of heat generated at seam welding by the welding unit 3 on the robot arm 2 can be reduced.

In addition, in the seam welding robot 1b, the welding unit 3 is configured to be changed in orientation following the motion of the robot arm 2 posterior to the wrist portion 26 in the direction of welding. This further improves the welding unit 3 in property of following the robot arm 2.

As described above, in the seam welding robot 1b according to the third embodiment, motion control on the robot arm 2 is easily performed. Further, in the seam welding robot 1b, an influence of heat generated at seam welding on the robot arm 2 can be reduced. Moreover, in the seam welding robot 1b, the welding unit 3 can be further improved in property of following the robot arm 2.

Fourth Embodiment

Next, a seam welding robot 1c according to a fourth embodiment will be described with reference to FIG. 10. In the embodiment, the same components depicted in FIG. 10 as those depicted in FIG. 2 are given the same reference numerals as those depicted in FIG. 2, and descriptions thereof will be omitted.

Figure 10:
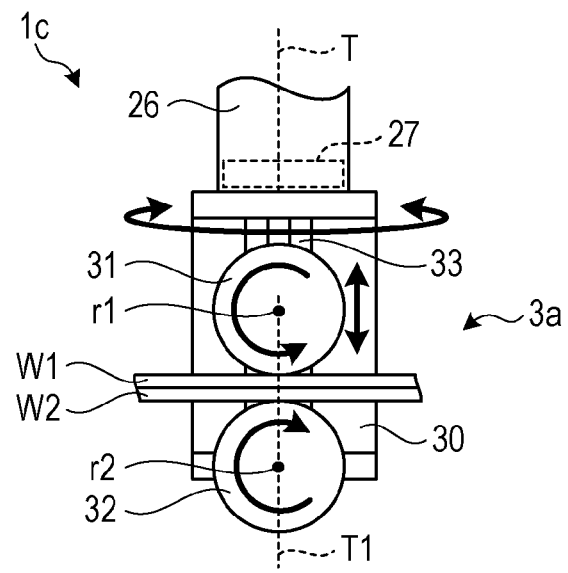
FIG. 10 is an explanatory diagram schematically illustrating a tip portion of a robot arm in a seam welding robot according to a fourth embodiment.

FIG. 10 is an explanatory diagram schematically illustrating a tip portion of the robot arm 2 in the seam welding robot 1c according to the fourth embodiment. FIG. 10 depicts schematically a front surface of the welding unit 3a as seen from the left side in the direction of welding.

As depicted in FIG. 10, in the seam welding robot 1c according to the fourth embodiment, a welding unit 3a does not include the rotation mechanism 37. In the seam welding robot 1c, the robot arm 2 includes a rotation mechanism (second rotation mechanism) 27 at a position within the wrist portion 26 to which the welding unit 3a is coupled. In this regard, the seam welding robot 1c in this embodiment is different from the seam welding robot 1 in the first embodiment.

The rotation mechanism 27 follows the motion of the robot arm 2. A lower surface of the rotation mechanism 27 is coupled to the upper surface of the frame 30 at the welding part 3. The rotation mechanism 27 can freely rotate around the axis T as a rotation axis. The axis T substantially coincides with the straight line T1 connecting rotation centers of the first roller electrode 31 and the second roller electrode 32.

Thus, when the rotation mechanism 27 is provided at the side close to the robot arm 2, the rotation mechanism 27 rotates following the motion of the robot arm 2, thereby making it possible to change the orientation of the welding part 3a. Therefore, according to the seam welding robot 1c according to the fourth embodiment, it is possible to simplify the motion control of the robot arm 2.

Fifth Embodiment

Next, a seam welding robot 1d according to a fifth embodiment will be described with reference to FIG. 11. In the embodiment, the same components depicted in FIG. 11 as those depicted in FIG. 8 or 10 are given the same reference numerals as those depicted in FIG. 8 or 10, and descriptions thereof will be omitted.

Figure 11:
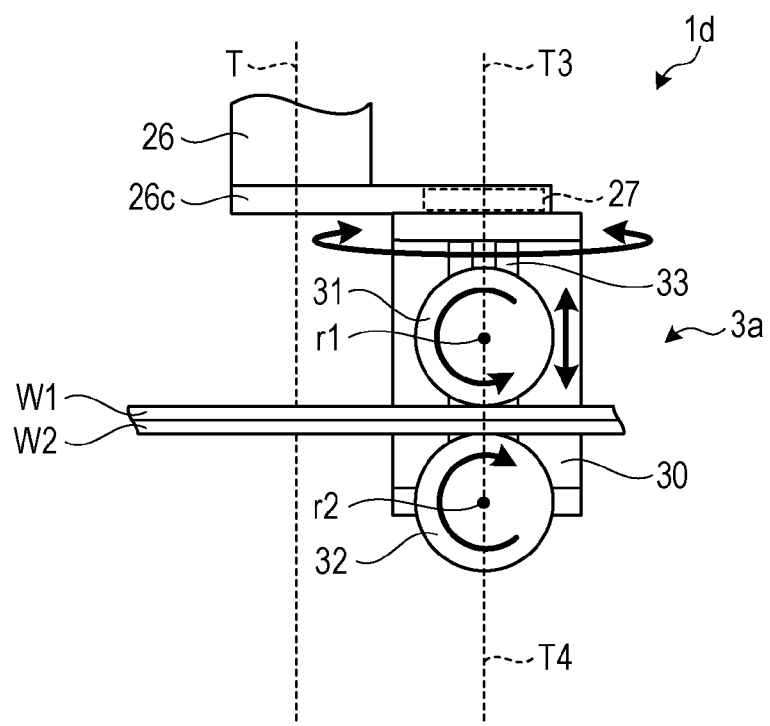
FIG. 11 is an explanatory diagram schematically illustrating a tip portion of a robot arm in a seam welding robot according to a fifth embodiment.

FIG. 11 is an explanatory diagram schematically illustrating a tip portion of the robot arm 2 in the seam welding robot 1d according to the fifth embodiment. FIG. 11 depicts schematically a front surface of the welding unit 3a as seen from the left side in the direction of welding.

As depicted in FIG. 11, the seam welding robot 1d according to the fifth embodiment includes substantially the same welding unit 3a as the welding unit depicted in FIG. 10. In the seam welding robot 1d, a plate 26c having substantially the same shape as that of the plate 26b depicted in FIG. 8 is fixed to a tip portion of the wrist portion 26. Further, the rotation mechanism 27 is provided within the plate 26c at a position distant from the wrist portion 26. The upper surface of the frame 30 at the welding unit 3a is rotatably coupled to the lower surface of the rotation mechanism 27.

Thus, the relative position relationship between the axis T3 and the straight line T4 and the axis T in the seam welding robot 1*d* according to the fifth embodiment is substantially equal to the relative position relationship between the axis T3 and the straight line T4 and the axis T in the seam welding robot 1*b* depicted in FIG. 8.

That is, in the seam welding robot 1*d*, the rotation axis T of the wrist portion 26 and the rotation axis T3 of the rotation mechanism 27 are shifted from each other. Specifically, in the seam welding robot 1*d*, the rotation mechanism 27 (or the rotation axis T3 of the rotation mechanism 37) is disposed at a position shifted from the tip portion of the robot arm 2.

Further, in the seam welding robot 1*d*, the rotation axis T3 of the rotation mechanism 37 is positioned posterior to the rotation axis T of the wrist portion 26 in the direction of welding.

Therefore, in the seam welding robot 1*d* according to the fifth embodiment, it is also easy to perform the motion control on the robot arm 2. Further, in the seam welding robot 1*d*, it is possible to reduce influence of heat generated at seam welding on the robot arm 2. Moreover, in the seam welding robot 1*d*, it is possible to further improve the welding unit 3*a* in property of following the robot arm 2.

Some or all of the rotation mechanisms according to first to fifth embodiments as described above may be omitted. In the case of omitting the rotation mechanism, a servo motor may be provided within the wrist portion of the robot arm, instead of the rotation mechanism. The servo motor may be used to rotate the welding unit.

In such a configuration, the robot controller performs the servo float control on the servo motor. Under the servo float control, the robot controller rotates the welding unit by the servo motor within the wrist portion until a load torque applied from the welding unit to the servo motor within the wrist portion exceeds a predetermined threshold value.

When the load torque applied from the welding unit to the servo motor within the wrist portion exceeds the threshold value, the robot controller controls operation of the servo motor within the wrist portion such that the welding unit rotates around the wrist portion to follow the motion of the robot arm. Thus, even if the rotation mechanism is omitted, conduct seam welding can be conducted while the motion control on the robot arm can be simplified as in the first to fifth embodiments.

Further advantages and modification examples of the disclosure herein can be easily derived by a person skilled in the art. Thus, a wide variety of modes of the disclosure herein is not limited to the specific detailed and representative embodiments expressed and described above. Therefore, the disclosure herein can be modified in various manners without departing from the spirit or scope of the comprehensive concept of the disclosure defined by the attached claims and the equivalents.

The seam welding robot disclosed herein may be any of the following first to sixth seam welding robots. The first seam welding robot includes a robot arm, and a welding unit that is coupled to a tip side of the robot arm, rotates the two roller electrodes following motion of the robot arm while sandwiching objects to be welded between peripheral edge portions of two disc-shaped roller electrodes to pressurize the objects to be welded, and seam-welds the objects to be welded by a welding electric current passed between the two roller electrodes.

The second seam welding robot is configured such that the welding unit in the first seam welding robot further includes at a portion coupled to the robot arm a rotation mechanism that rotates following the motion of the robot arm. The third seam welding robot is configured such that the robot arm in the first seam welding robot further includes at a portion coupled to the welding unit a rotation mechanism that rotates following the motion of the robot arm.

The fourth seam welding robot is configured such that the rotation mechanism in the second or third seam welding robot is provided posterior to a tip of the robot arm in the direction of welding. The fifth seam welding robot is configured such that the rotation mechanism in any of the second to fourth seam welding robots rotates around a rotation axis coinciding with a straight line connecting rotation centers of the two roller electrodes.

The sixth seam welding robot is configured such that any of the first to fifth seam welding robots further includes a servo motor to pressurize a peripheral edge portion of one roller electrode toward a peripheral edge portion of the other roller electrode.

According to the first to sixth seam welding robots, it is possible to simplify motion control on the robot arm.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A seam welding robot, comprising:
   a robot arm;
   a welding device to seam-weld welding targets, the welding device comprising:
      a frame including a first plate and a second plate provided opposite to the first plate;
      a lifting and lowering device provided between the first plate and the second plate;
      a first roller electrode rotatably provided to the lifting and lowering device so as to be lifted and lowered between the first plate and the second plate; and
      a second roller electrode rotatably provided to a distal end of the second plate, the first roller electrode and the second roller electrode being configured to rotate following motion of the robot arm while sandwiching and pressurizing the welding targets; and
   a rotation mechanism provided between the robot arm and the first plate so as to rotate following the motion of the robot arm, the rotation mechanism having a rotation axis on substantially the same straight line as a straight line connecting a rotation center of the first roller electrode and a rotation center of the second roller electrode.

2. The seam welding robot according to claim 1, wherein the rotation axis of the rotation mechanism is shifted from a tip of the robot arm.

3. The seam welding robot according to claim 2, wherein the rotation mechanism is provided posterior to the tip of the robot arm in a direction of welding.

4. The seam welding robot according to claim 1, further comprising:
   a servo motor configured to pressurize a peripheral edge portion of the first roller electrode toward a peripheral edge portion of the second roller electrode.

* * * * *